United States Patent [19]

Steinmetz

[11] 3,964,801

[45] June 22, 1976

[54] WIPING DEVICE FOR TELESCOPICALLY DISPLACEABLE COVER BOXES OF COVERING DEVICES ON SLIDING AND GUIDING PATHS OF MACHINE TOOLS

[75] Inventor: Dietmar Steinmetz, Siegen, Germany

[73] Assignee: Kabelschlepp Gesellschaft mit beschrankter Haftung, Siegen, Germany

[22] Filed: Jan. 13, 1975

[21] Appl. No.: 540,713

[30] Foreign Application Priority Data

Jan. 15, 1974 Germany............................ 2401674

[52] U.S. Cl................................ 308/3.5; 15/256.5; 160/202; 308/3 A
[51] Int. Cl.²......................................... F16C 23/02
[58] Field of Search........ 308/3.5, 3 R, 3 A, DIG. 8; 160/11, 202, 223, 214, 222; 267/69, 102; 49/309, 482, 489, 492, 494, 475; 220/8; 15/256.5

[56] References Cited
UNITED STATES PATENTS

| | | | |
|---|---|---|---|
| 3,485,138 | 12/1969 | Staehle............................ | 308/3.5 X |
| 3,690,038 | 9/1972 | Dieterich............................. | 49/489 |
| 3,691,588 | 9/1972 | Hennig et al. .................... | 308/3.5 X |
| 3,751,120 | 8/1973 | Kietz............................... | 160/202 X |

Primary Examiner—M. H. Wood, Jr.
Assistant Examiner—Gene A. Church
Attorney, Agent, or Firm—Walter Becker

[57] ABSTRACT

For use in connection with a machine tool or the like a covering device comprising a plurality of telescopically interengaging cover boxes movable relative to each other and provided with a sealing lip forming part of a profile of elastic material. This profile comprises a head end which includes the sealing lip and is bevelled on its outside and also includes an anchoring web which engages a gap defined by the respective adjacent cover box and a respective adjacent carrier part. The lower surface of the carrier part forms the supporting surface for the respective cover box for conveying the weight of the latter onto the surface of the respective cover box therebelow. The anchoring web inserted into the gap has associated therewith teeth engaging corresponding teeth provided in the carrier part.

5 Claims, 4 Drawing Figures

WIPING DEVICE FOR TELESCOPICALLY DISPLACEABLE COVER BOXES OF COVERING DEVICES ON SLIDING AND GUIDING PATHS OF MACHINE TOOLS

The present invention relates to a wiping or stripping device for cover boxes which are telescopically slideable relative to each other and are used in connection with cover-up devices on sliding and guiding paths of machine tools or the like. More specifically, the present invention relates to a wiping or stripping device of the type set forth above which is equipped with a sealing lip of elastic material, in which the sealing lip forms a part of a profile of elastic material. This profile comprises a head end including the sealing lip and being slanted on the outside and also comprises an anchoring or a tying web which extends parallel to the displacing direction and which engages a gap of an L-shaped carrier part positively holding said profile, said gap being open toward the wiping or stripping direction.

Heretofore known wiping or stripping devices primarily comprise a metallic carrier strip and a sealing lip of elastic material which sealing lip is firmly vulcanized to said carrier strip. These heretofore known wiping or stripping devices are by means of the carrier strip connected below the sealing edge of the cover box, for instance by riveting. The heretofore known wiping or stripping devices have not only the drawback that they are very expensive but also that when an exchange becomes necessary, the entire covering device has to be disassembled in order to replace the wiping device with the worn sealing strip by a new wiping device.

A telescopic steel cover device has become known according to which the wiping lips are provided with a reinforcement and are exchangeably held on the pertaining cover box. These wiping lips are by means of a positive snap connection held on carrier parts and can be exchanged from the front in assembled condition of the covering boxes. The drawback of this known design and arrangement of the wiping lips consists on one hand in that the wiping lip has a relatively large profile and therefore has to be provided with an additional reinforcement in order to assure that it will remain form-stable. Another drawback consists in that the wiping lip itself extends below the carrier part connected to the pertaining cover box and simultaneously is employed as support and as sliding element. As a result thereof, an additional wear is unfavorable so that the wiping lip has to be exchanged already after a relatively short time of operation.

It is, therefore, an object of the present invention so to design the wiping or stripping device that a smaller profile will suffice for the wiping or stripping lip and consequently an additional reinforcement will be superfluous.

It is a further object of this invention so to design the wiping device that the wiping or stripping lip itself is not used as carrier or sliding element in order to avoid the wear inherent thereto.

These and other objects and advantages of the invention will appear more clearly from the following specification in connection with the accompanying drawing in which.

Figure 1:
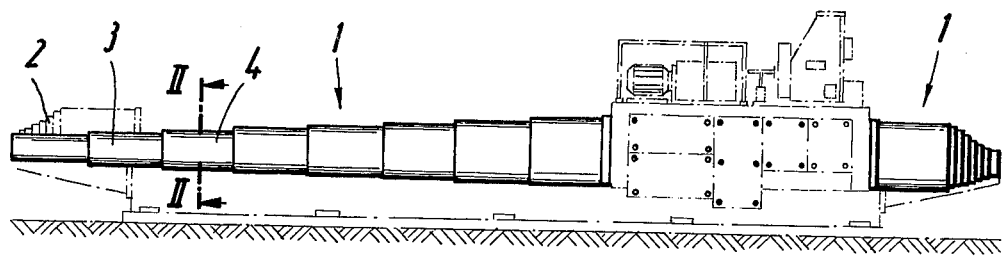
FIG. 1 is a side view of a covering device according to the invention for a machine tool.
Figure 2:
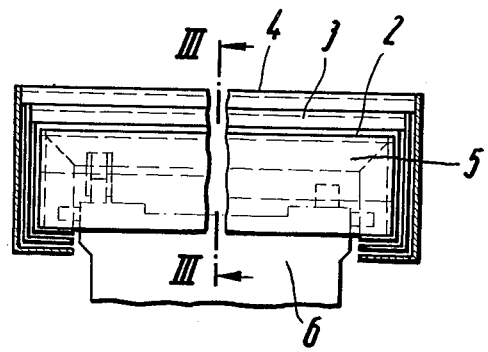
FIG. 2 shows a section taken along the line II—II of FIG. 1.
Figure 3:
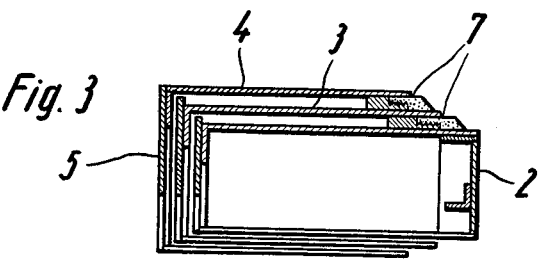
FIG. 3 is a section taken along the line III—III of FIG. 2.
Figure 4:
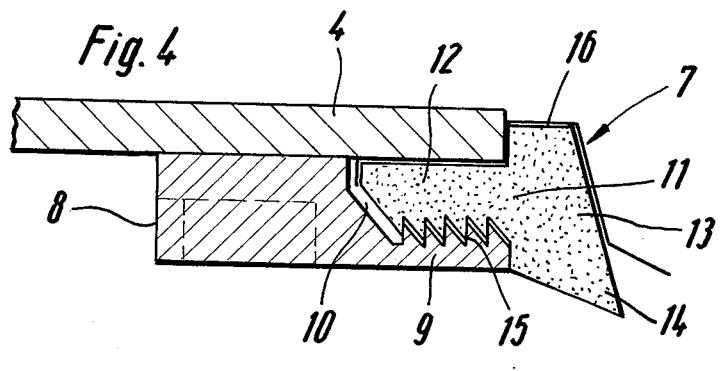
FIG. 4 illustrates on an enlarged scale and in cross section a section of the front supporting end of a cover box with a wiping or stripping device built thereon.

The device according to the present invention is characterized primarily in that the lower surface of the carrier part, similar to devices for clamping sealing strips, forms the supporting surface for the cover box for transferring the weight to the surface of the cover box therebelow while the anchoring web inserted into the gap has for purposes of forming the positive holding means associated therewith a tooth profile engaging the gap surface of the carrier part.

According to a practical embodiment of the invention, the arrangement is expediently such that the inner flanks of the tooth profile extend perpendicularly with regard to the direction of displacement so that the sealing strip can easily be inserted from the front but can be pulled out toward the front only after overcoming a certain resistance. Moreover, in order to protect the sealing strip against glowing chips, a protective plate can be inserted between the cover box and the sealing strip.

According to a further development of the invention, the bottom side of the carrier part may be coated with a sliding material which is more wear resistant than the material from which the sealing strip is made. However, it is also possible to provide a groove in the bottom side of the carrier part and to insert into said groove a strip of particularly well sliding and wear resistant material.

Referring now to the drawing in detail, a covering device 1 according to the invention is composed of a plurality of cover boxes 2, 3, 4, which are telescopically slideable relative to each other and which are respectively supported by means of a rear wall 5 on a guiding path 6 and slide upon each other at the front open end. In the gaps between the individual cover boxes 2, 3, 4, wiping devices 7 have to be provided in order to prevent chips, soil and dust from passing onto the guiding path 6.

The wiping device 7 consists primarily of a carrier strip 8 which has an L-shaped cross section and is provided with a clamping arm 9 which toward the sealing edge of the cover box 4 forms a gap open toward the front. The device 7 furthermore comprises a sealing strip 11 of T-shaped cross section with an anchoring web 12, a head 13, and a sealing lip 14. Between the contacting surfaces of the clamping arm 7 on the carrier strip 8 and the and the anchoring web 12 on the sealing strip 11 there is provided a tooth profile 15 for safely holding the sealing strip 11 in the gap 10.

For purposes of protecting the sealing strip 11 against glowing chips, there is provided a protective plate 16 which during the assembly is with the sealing strip 11 pushed into the gap 10. With the wiping device according to the invention, the weight of the cover box to which the device is connected rests on the carrier strip 8. As a result thereof, the sealing strip 11 and in particular the sealing lip 14 are saved so that a longer service life can be realized. The bottom side of the carrier strip 8 may be coated with a sliding material in order to reduce the friction losses between the individual cover boxes.

As will be evident from the above, the wiping device according to the invention not only has the advantage that a sealing strip with worn off sealing lip can be pulled out toward the front from the carrier part and can be exchanged with a new sealing strip without the necessity of disassembling the covering device, but the sealing strip also has a very small profile so that it can be produced at low prices, for instance by extrusion without additional reinforcements. A further advantage consists in that the sealing strip itself is not used for carrying the covering box and is not used as sliding layer. In this way in particular the sealing lip of the sealing strip is relieved with the result that the wear is considerably reduced.

It is, of course, to be understood that the present invention is, by no means, limited to the specific showing in the drawing but also comprises any modifications within the scope of the appended claims.

What I claim is:

1. For use in connection with a machine tool having a sliding and guiding path, a covering device for covering such path, which includes: a plurality of telescopically interengaging cover boxes movable relative to each other, each of said cover boxes being provided with a rear wall for resting on such sliding and guiding path, wiper means respectively interposed between two cover boxes adjacent to each other and one above the other, each of said wiper means including a carrier member connected to the top portion of the respective adjacent cover box and having its lower surface resting on the respective next lower cover box for conveying the weight of the former onto the latter, each of said carrier members defining with the cover box pertaining thereto a gap open at one end, and a plurality of sealing means respectively arranged in said gaps and respectively connected to said carrier members, each of said sealing means being firmly connected to the respective pertaining carrier member, each of said carrier members being provided with teeth and each of said sealing means consisting of elastic material and having an outer wiping lip and having teeth positively engaging the teeth of the respective adjacent carrier member.

2. An arrangement according to claim 1, in which there are inner flanks of the teeth of said carrier members and adjacent flanks of the pertaining sealing means that extend perpendicularly with regard to the direction of movement of said cover boxes.

3. An arrangement according to claim 1, which includes a plurality of protective plate means respectively associated with said sealing means, each of said plate means being interposed between one of said cover boxes and the respective adjacent sealing means and having a portion extending over an exposed portion of said wiping lip.

4. An arrangement according to claim 1, in which the underside of said carrier member has a coat of sliding material.

5. An arrangement according to claim 4, in which the underside of said carrier members is provided with a coat of a sliding material known under the trade mark "Teflon".

* * * * *